United States Patent [19]

Eskildsen

[11] Patent Number: 4,625,749

[45] Date of Patent: Dec. 2, 1986

[54] PRESSURE SUPPLY DEVICE FOR A HYDRAULIC SYSTEM

[75] Inventor: Christian Eskildsen, Sonderborg, Denmark

[73] Assignee: Danfoss A/S, Nordborg, Denmark

[21] Appl. No.: 735,269

[22] Filed: May 17, 1985

[30] Foreign Application Priority Data

Jun. 2, 1984 [DE] Fed. Rep. of Germany ....... 3420674

[51] Int. Cl.[4] .............................................. G05D 16/04

[52] U.S. Cl. ....................................... 137/115; 60/420; 60/468

[58] Field of Search .................... 60/420, 468; 137/115

[56] References Cited

U.S. PATENT DOCUMENTS 4,249,557 2/1981 Habiger ............................ 60/420 X
4,413,472 11/1983 Lang ................................ 60/468 X

FOREIGN PATENT DOCUMENTS 574554 10/1977 U.S.S.R. ................................ 60/468

OTHER PUBLICATIONS

BFPR Journal of Oklahoma State University; vol. 13, No. 4, p. 392; Oct. 1980.

*Primary Examiner*—Robert G. Nilson
*Attorney, Agent, or Firm*—Wayne B. Easton

[57] ABSTRACT

The invention relates to apparatus for supplying a pressurized fluid to a hydraulic system. The apparatus has a diverting path in parallel with the main supply line which is designed and is operable to minimize the inherent losses associated with such a diverting path. In the unit herein the diverting path has a pressure regulating valve and constant pressure drop valve in series. A control line branches from between the two valves and a load sensing is utlized to bias the pressure regulating valve in a closing direction.

4 Claims, 2 Drawing Figures

PRESSURE SUPPLY DEVICE FOR A HYDRAULIC SYSTEM

Figure 1:
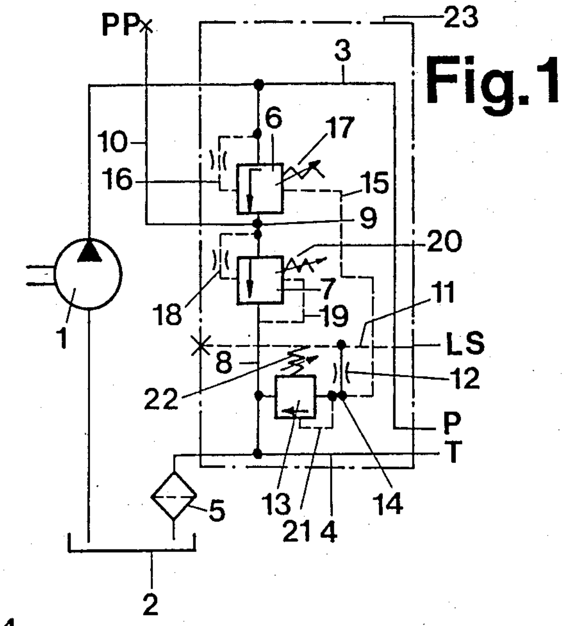

The invention relates to a pressure supply device for a hydraulic system comprising a pump of which the pressure can be influenced by diverting pressure fluid over a valved diverting path leading from the pump conduit to the container, and a control pressure conduit fed by the pump.

In a known pressure supply device of this kind (BFPR—Journal 1980, Page 392, FIG. 4), two diverting paths are provided in parallel. One contains a diverting valve reacting to an over-pressure and the other a diverting valve which is controlled on the one hand by the pump pressure and on the other hand by a load pressure tapped behind a proportional valve as well as a spring force, so that the same pressure drop will always occur at the proportional valve. The control pressure conduit which is at a control pressure for remote controllable actuating valves is connected to the pump outlet by way of a pressure reducing valve which keeps the control pressure constant.

The invention is based on the problem of avoiding the losses in a pressure supply device of the aforementioned kind.

This problem is solved according to the invention in that the diverting path contains two valves in series, of which the first is controlled in the manner of a known diverting valve and the second is set to a constant pressure drop, and that the control pressure conduit branches off between the two valves.

In this construction, the diverting path between the pump conduit and container is utilised to form a pressure divider at which the control pressure can be tapped. The control pressure conduit is therefore fed by part of the pressure fluid which has to be diverted in any case, the first valve bringing about the required reduction in pressure. This does not increase the losses in the diverting path. The control pressure is therefore produced without the additional losses that otherwise occur. The two valves co-operate functionally. When the first valve alters its opening cross section by reason of changes in the pump pressure, the second valve follows in a manner such that the pressure drop across it continues to maintain a value corresponding to the control pressure.

In a preferred embodiment comprising a pump with constant compression and load-pressure dependent diverting control, the first valve is adjustable depending on the one hand on the pump pressure and on the other hand on the load pressure and a spring force and the second valve is adjustable on the one hand by the pressure between the valves and on the other hand by the ocntainer pressure and a spring force. The two valves can therefore, have a very simple construction.

In particular, a signalling conduit at the load-pressure may be connected by way of the series circuit of a throttle and an over-pressure valve to the container, and the signal connecting conduit leading to the first valve may branch off between the throttle and over-pressure valve. This leads to automatic limiting of the load-pressure at overload because the influence of the load pressure on the first valve is reduced, the latter opens further and the pump pressure is thereby lowered.

Further, the control pressure may serve to actuate proportional valves which close on a reduction in the control pressure. If in operation the pump cannot supply the amount of liquid demanded by the consumers, the two valves will close. The control pressure can therefore no longer be maintained and for this reason the proportional valves will move to the neutral position. The pump pressure will thereby rise again, as will the control pressure. The proportional valves will be operated again and a new state of equilibrium will be set up in which the originally demanded (excessively high) operation is no longer fulfilled.

If the control pressure is not to disappear completely, the first valve may reach its end position before it is completely closed. This ensures that the connection between the pump conduit and control pressure conduit will never be completely interrupted.

Desirably, the first valve, the second valve and possibly the over-pressure valve are disposed in a common housing block. Such a housing block can, for example, contain a throughgoing bore for each of the pump conduit, container conduit and load pressure signalling conduit and can be readily combined with other valve units.

In addition, it is recommended that the spring forces of the valves be adjustable. In this way, the valves can be adapted to the conditions of a particular installation.

Figure 2:
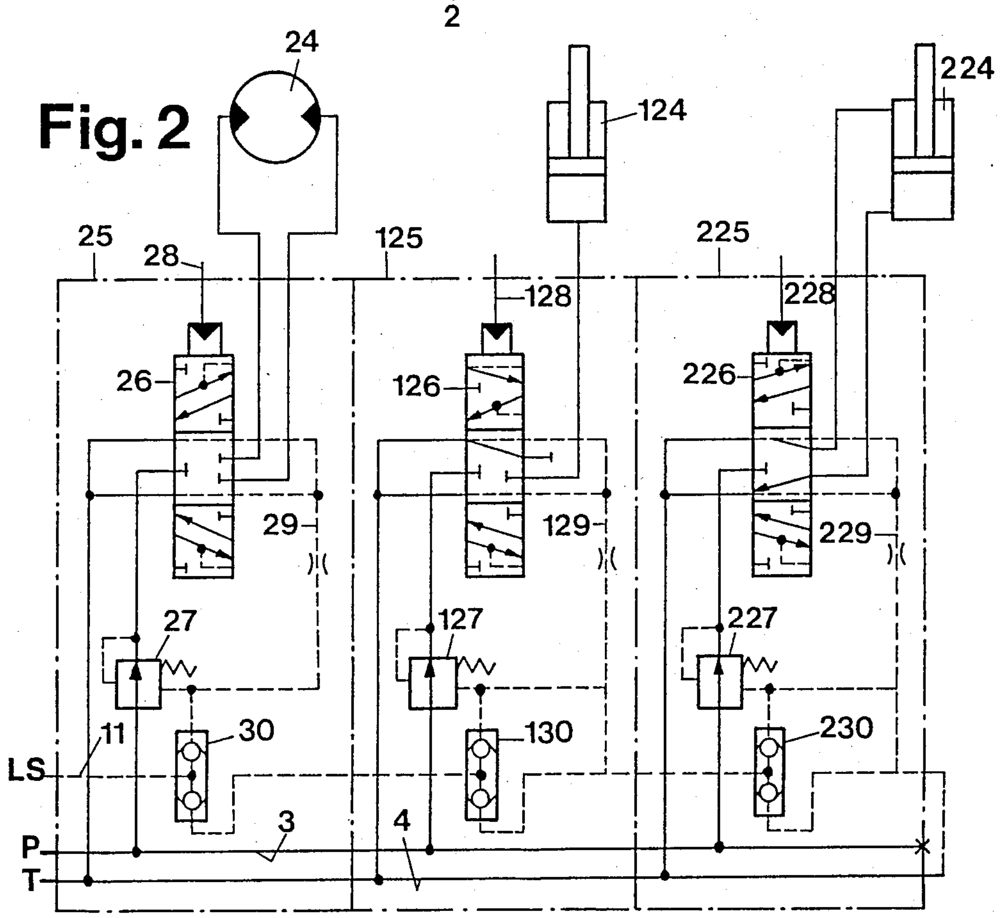

Preferred examples of the invention will now be described in more detail with reference to the drawing, wherein:

FIG. 1 shows a first embodiment of a pressure supply device according to the invention and FIG. 2 illustrates by way of example three consumers to which pressure fluid can be supplied with the aid of the pressure supply device of FIG. 1.

FIG. 1 illustrates a pump 1 with constant compression feeding pressure fluid from a container 2 to pump conduit 3. A container conduit 4 is provided with a filter 5. A first valve 6 and a second valve 7 form a series circuit in a diverting path 8 leading from the pump conduit 3 to the container conduit 4. At a point 9 between the two valves 6 and 7, a control pressure conduit 10 branches off. A load pressure signalling conduit 11 is connected to the container conduit 4 by way of the series circuit of a throttle 12 and an over-pressure valve 13. A load signal connecting conduit 15 branches off at a point 14 between the throttle 12 and over-pressure valve 13.

The first valve 6 comprises a slide which is subjected on the one side to the pump pressure P by way of a control conduit 16 and on the other side to an adjustable spring 17 and the load-pressure LS in the connecting conduit 15. The second valve 7, which may be simpler than the first valve and be in the form of a seating valve, is biased in the one direction by the control pressure PP by way of a control conduit 18 and on the otherside by the container pressure T by way of a control conduit 19 and by an adjustable spring 20. The over-pressure valve 13 is biased on the one side by the load pressure LS by way of a control conduit 21 and on the otherside by an adjustable spring 22. The three valves 6, 7 and 13 are disposed in a common housing block 23 which can be part of a pump unit and comprise connecting nipple and bores subjected to the pump pressure P, the container pressure T, the load-pressure LS and the control pressure PP.

FIG. 2 joins onto the right hand side of FIG. 1. Three consumers are provided, namely a hydraulic motor 24, a servo piston 124 which can be loaded in one sense, and a servo piston 224 which can be loaded on both sides. Each consumer is associated with one valve block 25, 125, 225, respectively. The consumers are operated by way of proportional valves 26, 126 and 226, respectively, which are each preceeded by a quantity regulating valve 27, 127 and 227 and which are adjustable by way of control pressure conduits 28, 128 and 228, respectively. The illustration of these proportional valves has been simplified. They usually comprise a slide biased by neutral position springs and a control piston which is adjusted by the control pressure in the correct sense so that, with a reduction in control pressure the valve will approach the neutral closing position. The respective load-pressure is tapped off by way of a sensing conduit 29, 129 and 229 and fed on the one hand to its own quantity regulating valve 27, 127 and 227 and on the other hand by way of a change-over valve 30, 130, 230 to the common load-pressure conduit 11.

If the hydraulic system consisting of the circuit of FIGS. 1 and 2 is in operation, the pump pressure P is set to a value which lies above the load pressure LS by a value determined by the spring 17. A typical difference between the load- pressure LS and the pump pressure P is 15–25 bar, particularly 20 bar. This is because the first valve 6 opens so far that the pump pressure assumes the stated value. The second valve 7 will in turn open automatically so far that the control pressure PP in the control conduit 10 assumes a desired value. This value will generally be between 10 and 15 bar, for example 13 bar. This value is determined by the spring 20. Since, for reasons of pump pressure control, pressure fluid is continuously diverted by way of the diverting path 8, no additional amount of pressure fluid is required to achieve the control pressure PP. The losses are correspondingly low.

If the load pressure LS assumes a value larger than the value set by the spring 22 of the over-pressure valve, this valve will open. A pressure drop will occur at the throttle 12. The load pressure acting on the first valve 6 is reduced. Consequently, the first valve 6 will open further, the pump pressure 3 will drop and the excessive load pressure is reduced.

If all consumers 24, 124, 224 are to be operated fully simultaneously and if the pump 1 is thereby overloaded, the pump pressure P will drop and the first valve 6 approaches the closed position. However, since it will not close completely in order always to achieve a control pressure PP, the control pressure PP will drop together with the pump pressure P when the first valve 6 has reached its smallest position of opening. Consequently, the proportional valves 26, 126, 226 will be displaced towards the closed position. This reduces the load on the pump 1 and the pump pressure P can rise to the desired value again. The safe operating condition is therefore resumed again.

I claim:

1. A pressure supply device for a hydraulic system, comprising, a pump and a pump conduit connected to an output port, a diverting path in parallel with said pump conduit and connected to inlet and tank ports, said diverting path being operable to divert fluid during normal operation when there is fluid flow in said pump conduit downstream for the connection of said diverting path to said pump conduit, first and second valves in series in said diverting path with said first valve being a pressure regulating valve and said second valve providing a constant pressure drop, said valves forming a pressure divider at a point between said valves, and a control pressure conduit branching off from said point between said valves for operating a plurality of proportional valves of consumer units.

2. A pressure supply device according to claim 1, including a load sensing port, said first valve being biased in an opening direction in accordance with the pressure in said pump conduit and said second valve being biased in an opening direction in accordance with the pressure in said control pressure conduit, spring means biasing said first and second valves in closing directions, and said first valve being connected to said load sensing port via a load signal conduit for biasing said first valve in a closing direction in accordance with the pressure at said load sensing port.

3. A pressure supply device according to claim 2, including a third valve having a pressure regulating function and having the output side thereof connected to said tank port, a throttle valve between said load sensing port and the inlet of said third valve, said load signal conduit branching from between said throttle valve and the inlet of said third valve.

4. A pressure supply device according to claims 1, 2 or 3 charcterized in that said first valve reaches its end position before it is completely closed.

* * * * *